Patented Aug. 6, 1935

2,010,692

UNITED STATES PATENT OFFICE 2,010,692

ESTER AND METHOD OF MAKING SAME

Ernest F. Grether and Earl L. Pelton, Midland, Mich., assignors to The Dow Chemical Company, Midland, Mich., a corporation of Michigan No Drawing. Application September 2, 1933, Serial No. 688,031

7 Claims. (Cl. 260—99.40)

This invention concerns new esters suitable for employment in flavorings and perfumes.

In a co-pending application of E. L. Pelton, Serial No. 687,683, filed August 31, 1933, it is disclosed that an acid having the empirical formula $C_{12}H_{20}O_2$ can be made by oxidizing cyclohexanol or cyclohexanone with fused caustic alkali and acidifying the reacted mixture. The structure of the acid has not definitely been ascertained, but it is thought to be a decahydronaphthyl-acetic acid. Said acid is a colorless oily liquid of molecular weight 196, boiling point 195–198° C. at 38 millimeters pressure, freezing point approximately −11° C., and specific gravity 0.9861 at 20° C. as compared with water at 4° C.

We have now found that the esters of said acid are valuable for employment in flavorings and/or perfumes. The alkyl esters, particularly the methyl and ethyl esters, are relatively non-toxic toward humans, the toxicities being on the order of those of the commonly used flavoring substances vanillin and oil of wintergreen. The methyl and ethyl esters possess the flavor and fragrance of pear and quince, respectively, and are, accordingly, adapted to direct employment as flavorings or perfumes. The higher esters are relatively non-volatile liquids or solids having relatively little odor and can be used as mediums and fixing agents for volatile perfumes.

The invention, then, consists in the new esters and method of making the same hereinafter fully described and particularly pointed out in the claims, the following description and examples setting forth in detail only several of the various ways in which the principle of the invention may be employed, it being understood that said description and examples are illustrative only and are not to be construed as limiting the invention.

Our new esters are prepared from the aforementioned acid, $C_{12}H_{20}O_2$, in any of the usual ways, for example, by reacting said acid with a di-alkyl sulphate, by heating the acid with an alcohol in the presence of a catalytic quantity of a strong mineral acid such as sulphuric acid or hydrochloric acid, etc. The esters are isolated and purified by fractionally distilling in the usual way. When sulphuric acid is used as a catalyst, care must be observed during the distillation to avoid charring of the organic materials.

The following table gives the properties of a number of our new esters.

Table

| Ester of $C_{12}H_{20}O_2$ | Boiling point | | Specific gravity 20°/4° C. | Odor and flavor |
|---|---|---|---|---|
| | ° C. | mm. pressure | | |
| Methyl | 103 | 2 | 0.958 | Pear. |
| Ethyl | 112 | 4 | 0.948 | Quince. |
| N-propyl | 167 | 18 | 0.947 | Slight. |
| Isopropyl | 165 | 18 | 0.943 | Slight. |
| Allyl | 122 | 3 | 0.954 | Slight. |

Each ester described in the table was prepared by heating under reflux a solution of the acid $C_{12}H_{20}O_2$ with a catalytic quantity, e. g. 3–10 cubic centimeters, of sulphuric acid in a large excess of the alcohol corresponding to the desired ester, and fractionally distilling the reacted mixture to isolate the ester product.

Other esters of the acid $C_{12}H_{20}O_2$, e. g. the tertiary butyl, isoamyl, nonyl, cyclohexyl, benzyl, phenylethyl, and crotonyl esters, may be prepared and used as hereinbefore described.

Other modes of applying the principle of our invention may be employed instead of those explained, change being made as regards the method herein disclosed, provided the steps or compounds stated by any of the following claims or the equivalent of such stated steps or compounds be employed.

We therefore particularly point out and distinctly claim as our invention:

1. The method which comprises esterifying an acid having the empirical formula $C_{12}H_{20}O_2$, said acid being produced by oxidizing cyclohexanol with fused caustic alkali and acidifying the reacted mixture.

2. The method which comprises reacting an alcohol with an acid having the empirical formula $C_{12}H_{20}O_2$, said acid being produced by oxidizing cyclohexanol with fused caustic alkali and acidifying the reacted mixture.

3. The method which comprises reacting an alcohol selected from the class consisting of methyl and ethyl alcohols with an acid having the empirical formula $C_{12}H_{20}O_2$, said acid being produced by oxidizing cyclohexanol with fused caustic alkali and acidifying the reacted mixture.

4. An ester of an acid having the empirical formula $C_{12}H_{20}O_2$, said acid being produced by oxidizing cyclohexanol with fused caustic alkali and acidifying the reacted mixture.

5. An alkyl ester of an acid having the empirical formula $C_{12}H_{20}O_2$, said acid being produced by oxidizing cyclohexanol with fused caustic alkali and acidifying the reacted mixture.

6. The methyl ester of the acid, $C_{12}H_{20}O_2$, said ester boiling at approximately 103° C. at 2 millimeters pressure, having the specific gravity 0.958 at 20° C. with respect to water at 4° C. and having a characteristic pear-like odor and flavor.

7. The ethyl ester of the acid, $C_{12}H_{20}O_2$, said ester boiling at 112° C. at 4 millimeters pressure, having the specific gravity 0.948 at 20° C. with respect to water at 4° C. and having a characteristic quince-like odor and flavor.

ERNEST F. GRETHER.
EARL L. PELTON.